United States Patent
Groot et al.

(10) Patent No.: US 8,562,354 B2
(45) Date of Patent: Oct. 22, 2013

(54) METHOD AND SYSTEM FOR SUPPORTING AND ENHANCING TIME MANAGEMENT SKILLS

(75) Inventors: Jodi Morstein Groot, Salt Lake City, UT (US); Lee Allen Hollaar, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 871 days.

(21) Appl. No.: 12/129,003

(22) Filed: May 29, 2008

(65) Prior Publication Data

US 2008/0299527 A1 Dec. 4, 2008

Related U.S. Application Data

(60) Provisional application No. 60/941,889, filed on Jun. 4, 2007.

(51) Int. Cl.
*G09B 19/00* (2006.01)
*G09B 3/00* (2006.01)
*G09B 7/00* (2006.01)

(52) U.S. Cl.
USPC ........... 434/236; 434/238; 434/322; 434/323; 434/350

(58) Field of Classification Search
USPC .......................... 434/236, 238, 322, 323, 350
See application file for complete search history.

(56) References Cited

U.S. PATENT DOCUMENTS

| | | | | |
|---|---|---|---|---|
| 6,042,383 | A * | 3/2000 | Herron | 434/238 |
| 6,364,362 | B1 * | 4/2002 | Severin | 283/17 |
| 2003/0087223 | A1 * | 5/2003 | Walker et al. | 434/353 |
| 2003/0129574 | A1 * | 7/2003 | Ferriol et al. | 434/362 |
| 2005/0214732 | A1 * | 9/2005 | Wen et al. | 434/350 |
| 2006/0194184 | A1 * | 8/2006 | Wagner | 434/350 |
| 2006/0204944 | A1 * | 9/2006 | Preskill | 434/322 |
| 2007/0089335 | A1 * | 4/2007 | Smith et al. | 40/446 |
| 2007/0298401 | A1 * | 12/2007 | Mohanty et al. | 434/350 |

* cited by examiner

*Primary Examiner* — Xuan Thai
*Assistant Examiner* — Jerry-Daryl Fletcher
(74) *Attorney, Agent, or Firm* — Stoel Rives LLP; Kory D. Christensen

(57) ABSTRACT

A method and system for supporting and enhancing time management skills. Through the use of an electronic time management device, such as a cell phone or other portable digital computer based device programmed to support this method, the user enters information about a task which is then verified and "banked points" are given for correct entry. The banked points can then be used toward a socially desirable reward, such as sending text messages or playing music or watching videos. This is particularly effective in teaching time management skills to young students who may have attention deficit hyperactivity disorder (ADHD).

19 Claims, 2 Drawing Sheets

METHOD AND SYSTEM FOR SUPPORTING AND ENHANCING TIME MANAGEMENT SKILLS

CROSS-REFERENCE TO RELATED APPLICATIONS

This application claims benefit of Provisional Patent Application Ser. No. 60/941,889, filed on Jun. 4, 2007, by the present inventors.

BACKGROUND OF THE INVENTION

This invention relates to supporting and enhancing time management skills, and in particular to reinforce those skills with children and adolescents who have been diagnosed with or have symptoms of attention deficit hyperactivity disorder (ADHD).

The most common neurobehavioral disorder diagnosed in children is ADHD. Conservative estimates indicate over 2 million American youth are experiencing some level of impairment related to the symptoms of ADHD. The Diagnostic and Statistical Manual of Mental Disorders reports the prevalence of ADHD as 3-7% in the school aged population. Other reviews note prevalence rates from 1.6-16%. A hallmark of ADHD in school and teen-aged youth is under-achievement and school failure. Research indicates 90% of those diagnosed with ADHD have significant difficulties at some time in their school experience. Up to 32% of students diagnosed with ADHD fail to complete high-school.

While medication does impact distractibility, hyperactivity, and impulsivity, its impact on academic achievement is less promising. The ability to sustain attention to task and resist distraction is particularly difficult when the required task is boring or repetitive. It is clear that symptoms of hyperactivity decrease across elementary school years. However, problems with attention persist and are relatively stable during the same period of development. Key brain activities related to executive function and working memory have been identified as probable factors in ADHD. Individuals with ADHD seem to have a diminished reactivity to stimuli and respond best to immediate reinforcement at the "point of performance." Time and timing of behaviors are often disrupted for individuals with ADHD, who have difficulty holding information in their minds that can be used to guide later performance. Difficulties anticipating what will happen next, repeating the same mistakes, planning for the future, remembering details, organizing tasks, and managing time are common issues for these individuals. There have been no significant breakthroughs in psychosocial or psycho-educational strategies for the treatment of ADHD.

For teachers of youth with ADHD, a number of challenges arise. These include having to frequently repeat or repetitively communicate "forgotten" assignments or projects, students' lack of preparation for quizzes or tests that are assigned in advance, and students attending classes without assigned and or required materials.

Parents/guardians of students with ADHD also encounter a number of difficulties. These include challenges communicating with teachers, insufficient or inaccurate information from students related to messages or assignments given by teachers, and missed appointments and meetings that are "not remembered" by students.

SUMMARY OF THE INVENTION

The present invention provides a solution to assist with time management, working memory, and executive function for students, especially those with ADHD. Accurately recording assignments, remembering homework and supplies, completing homework, handing in homework, and remembering future appointments, practices, and meetings are challenging tasks for many students and are especially difficult for those with ADHD.

It centers around one or more time management devices, which could be a "smart phone," pocket PC, media player, hand-held game device, or other easily-carried device on which programs adapted to implement the present invention can be run. Other computer programs, utilized by the teacher, student, or parent/guardian interact with the program on the student's time management devices.

The student enters information about tasks, such as homework assignments, into the time management device. That information is then furnished to the teacher or parent/guardian who validate that the information was entered correctly. When the task information has been validated, the student receives "banked points" which are stored in the time management device and can be later used by the student toward a socially desirable award, such as being able to make or receive telephone calls if the time management device is a cell phone, playing music or watching a video if the time management device has a media player function, or playing a game if the time management device acts as a game console.

Optionally, the time management device can be programmed to prompt the student to enter task information. Prompting can be based on a previously-entered class schedule, such that at the end of every class the student is prompted to enter the homework assignments from the class of indicate that there was no homework assignment.

The student may also receive banked points as the result of a task having been successfully completed, such as turning in an assignment and receiving a satisfactory grade.

Other embodiments of the present invention that provide additional capabilities or specific implementations of the present invention are described below, and other extensions are possible without departing from the spirit and scope of the present invention.

The present invention exists in a number of forms: a method for using an electronic time management device, a digital computer system programmed to be a time management device and used for performing the method of the present invention, and a computer-readable medium storing a computer program can be used in conjunction with a digital computer to produce the time management device capable of being used for performing the method of the present invention.

These and other features of the invention will be more readily understood upon consideration of the attached drawings and of the following detailed description of those drawings and the presently-preferred and other embodiments of the invention.

DETAILED DESCRIPTION OF THE INVENTION

A key aspect of the student's time management device is its ability to maintain information regarding homework and other assignments, as well as other time management information.

In the presently-preferred embodiment, a class schedule personalized for the student is entered into the student's time management device at the start of each school term (quarter or semester). Students will normally "wear" their time management device on a belt clip, sling pouch, or arm band when not in use. During school hours, capabilities of the time management device beyond maintaining information about homework or other assignments, such as its use as a telephone, media player, or game, will be disabled or reduced. Its use will normally be limited to assignment tracking, timing cues, and specific prompts. (It may, for example, allow calling or receiving calls from special phone numbers, such as those of the student's parent/guardian, or to emergency services, but not calls from friends of the student.)

Figure 1:
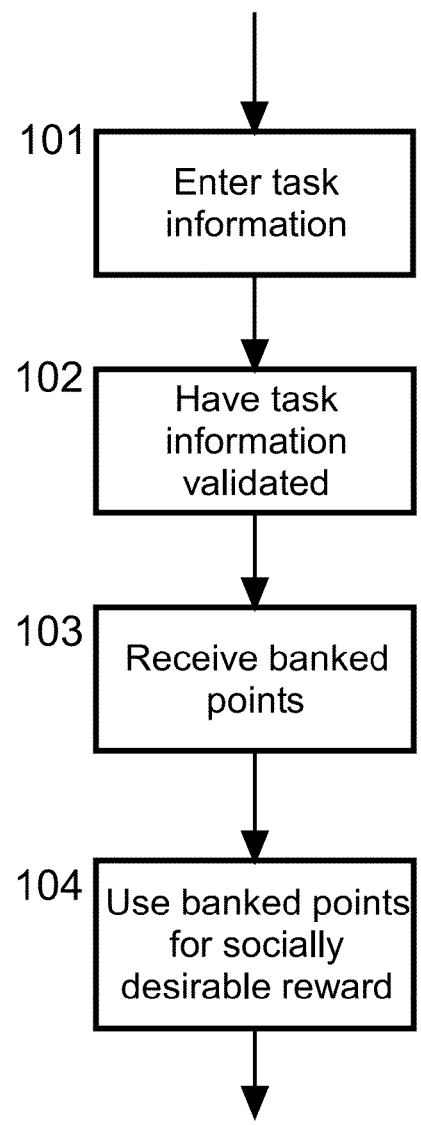
FIG. 1 illustrates the key steps of the present invention.

Referring to FIG. 1, in Step 101 the user enters information about a task into the time management device. This will normally be a student entering assignments on a page for each class period throughout the school day. Space for upcoming quizzes and test dates can also be provided, as students frequently fail to record events that are not in the present or are set for the future. Space will be provided for specific instructions or additional detail not available on the drop-down menu provided on the page. When student enters an assignment he/she will immediately receive an animated visual reward (such watching a brief anime or cartoon) and a numerical value, which will provide immediate reinforcement at the "point of performance." The menu will offer students space for noting "no assignment," "cancelled classes," or any other reason why an assignment was not made that day in class. If student does not make an entry for each class, the system will prompt student, through a vibration or visual cue.

Entered assignments will be noted and can be viewed on the daily task page as well as on a weekly and monthly calendar. Calendar function will indicate assignment dates, due dates, and time span for upcoming assignments with a visual cue on each day that exists from the time the assignment is given until it is to be turned in. Thus, assignments given over time will show up on the "to do list" each day.

In the presently-preferred embodiment, students will also be prompted to remember homework and supplies. When an assignment has been entered, at the end of the school day a prompt and vibration will occur which will cue the student to take home applicable text books and materials and will provide a daily "to do list" that reminds the student of his/her assignments and when they are due. The scheduling function on the calendar will record assignments that are due the next day as well as those that extend over time.

In Step 102, the user will have the task information validated. In order to assure that assignments are recorded accurately and reinforce positive student efforts at tracking, in the presently-preferred embodiment of the system includes a validation program operated by the teacher in conjunction with the time management device. The validation program can either be a stand-alone program used by the teacher or, preferably, a module integrated with the teacher's grade-recording system to reduce the teacher's effort by eliminating duplicate operations.

Figure 2:
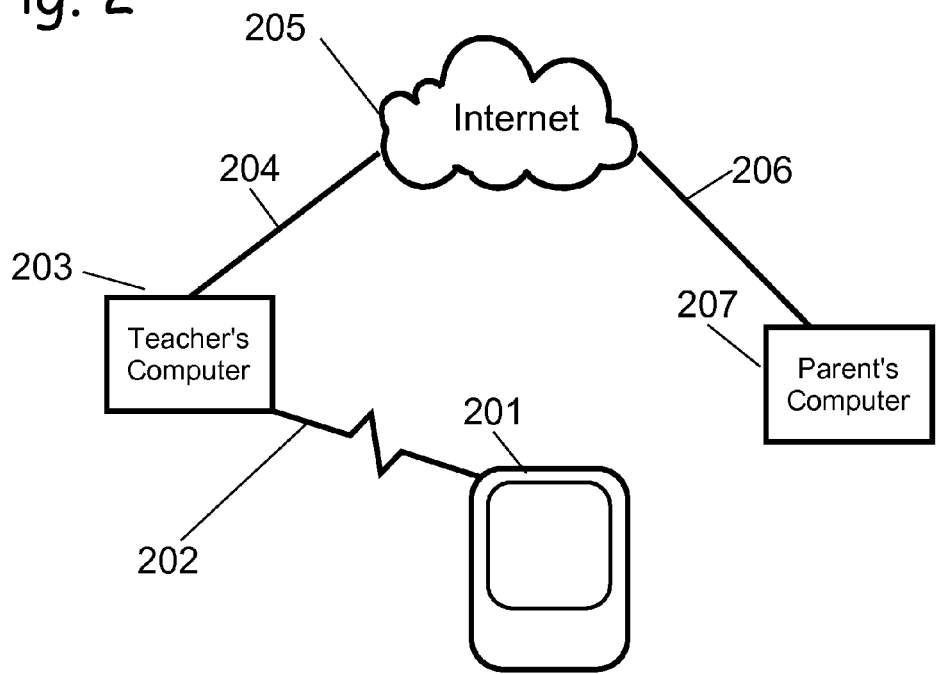
FIG. 2 illustrates a representative configuration for the present invention.

Referring to FIG. 2, in the presently-preferred embodiment each student's time management device 201 will connect to the validation program running on their teacher's computer 203 by the use of a wired connection, docking station, wireless Internet connection (WiFi), infrared connection, or preferably a Blue Tooth short-range wireless connection 202. Other connection techniques are also possible without departing from the claimed invention. The techniques used to establish and maintain such a connection are well-known to persons with ordinary skills in the art, and will depend on the particular device used to implement the time management device and the teacher's computer running the validation program.

As previously discussed, students will receive immediate visual and numerical rewards when they enter daily assignments into their time management system, regardless of whether or not the entry is accurate. An entertaining "reward" is important to reinforce the desired behavior of immediately entering assignments. Prior to leaving class, each student will transmit his or her assignment entries with the teachers' computer. If transmission is not completed, the time management device will provide the student a prompt through vibration or visual cue. The assignment as entered by the student will be reflected on the teacher's class information for the appropriate class period.

At a convenient point in the day, the teacher will check the student entries of assignment and validate the accuracy of those entries with "yes/save" or "no/correct" responses. The teacher will enter assignments correctly if student has missed information. Once the assignment has been corrected, the teacher responses will be stored on server or on teacher's computer, depending on how the teacher's validation program is configured. This could possibly include storing the information in a column added to teacher's electronic grade book.

Optionally, the teacher can provide an estimate for how long the assignment should take to complete. This can later be used by the student in scheduling times to work on the assignment.

Returning to FIG. 1, in Step 103 the user receives banked points that are stored in time management device 201 as a result of the validation of Step 102. In the presently-preferred embodiment, the next time the student's time management device connects with the teacher's validation program, the information entered by the teacher will be transmitted to the time management device. If student has accurately entered an assignment, a "reward" in the form of banked points will be given the student. If assignment needed to be adjusted by the teacher response, fewer or no points will be awarded, depending on the nature of the problem with the student's entry of the assignment.

In the presently-preferred embodiment, the system has the capability to track student assignment entry accuracy, teacher activity, and time of use. This tracking will aid in further development and modification of the system as well as demonstrate student patterns and consistency over time.

As an addition feature of the presently-preferred embodiment, assignment tracking and grading information from the teachers' computers 203 connected to Internet 205 by link 204 will be accessible to parent/guardian computer 207 connected to Internet 205 by link 206, all conventional technology. This will preferably be through a web site available to the parent and the teacher. Teachers will also have web-based tools for directly communicating with parents regarding permission slips, announcements, and other special information. The web-based teacher site will be available to whichever students/parents the teacher assigns access.

Parents who participate in the web-based program will be able to access both daily assignments and their student's grades through the web site. Thus, if student "forgets" his/her time management device, assignment information will still be accessible at home.

Beyond accurately entering assignments, the presently-preferred embodiment allows the student to gain visual and numerical rewards in additional ways. When students do their homework they can "check off" the completed assignments and works in progress on their daily task sheet, which will provide a visual and numerical reward. Parents can use the web-based tracking system to validate their completion and on-going efforts with homework, which will result in banked points.

Remembering to take homework back to school and handing it in is often a problem for students with ADHD. Early morning alarms and prompts will cue the students when homework needs to be taken back to school. When the student hands in homework he/she will "check off" that the assignment has been handed in from daily task list. At that time visual and numerical rewards will be given.

To the extent that homework can be handed in electronically, the time management device could be used to carry the homework to school, where it would be collected by the teacher using the communications methods similar to those used in communicating assignment information. The homework could be also handed in using a web-based program from the student's home or in a school computing area.

Alternatively, determination that the homework has been turned in can also be done by the teacher scanning a bar code or other symbol on the homework, or the student scanning it as part of turning in the homework, much as items are scanned at a store's checkout station. The bar code could be provided as a sticker by the teacher, or could be based on a number provided through the student's time management device for the assignment or as an object supplied by the time management device. The use of a bar code to label assignments could also allow the teacher to do "blind grading," where the students' identities are not known by the teacher until grades are actually being entered.

Final validation that homework has been turned would preferably occur when teachers enter grades in their electronic grade book or other grading system used by the school. At that point in time, it becomes possible to determine not only that the homework appears to have been turned in, but that it actually was done in a satisfactory way. Student points for handing in assignment will be banked and additional points will be given for student achievement on assignments at the time of the next connection of the student's time management device with the teacher's validation program.

In the presently-preferred embodiment, completed assignments with higher grades will receive higher points. It also awards a random number of points for high grades. For instance if the student gets a 90% or above on assignment he or she would normally get 15 points. However, at random times the student might also get an unexpected visual prompt and "jackpot" of 30 additional points. Thus, getting higher grades would be encouraged not only through receiving more points, but through intermittent reinforcement by the potential for a "big reward."

Figure 3:
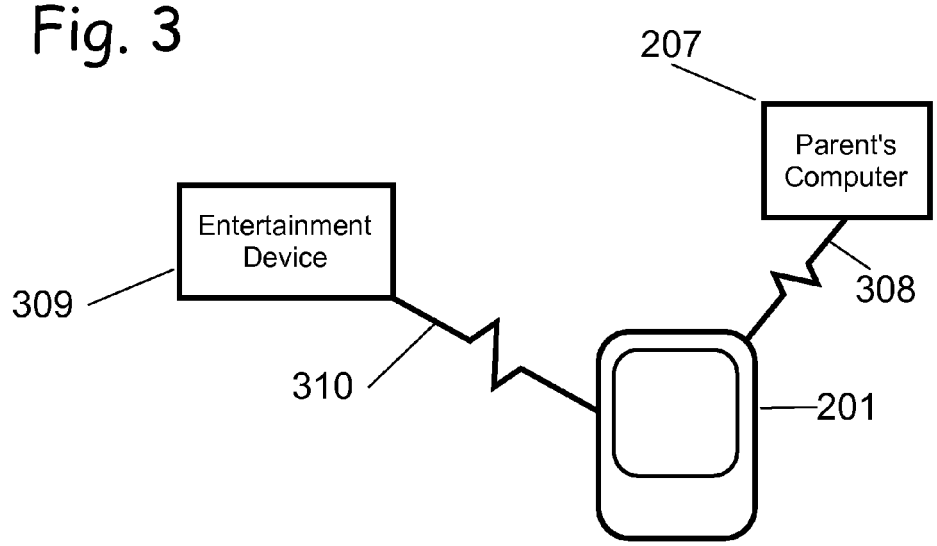
FIG. 3 illustrates another configuration for the present invention.

Parents/guardians and the student can also enter other tasks on the student's time management device, either directly or through the web-based system. Direct entry is illustrated in FIG. 3, with parent/guardian computer 207 communicating with time management device 201 over communications link 308.

For instance, practice schedules, doctor's appointments, meetings, or chores could be entered. As those tasks and appointments were checked off as completed, visual and numerical rewards would be given that could be validated and banked by parent entry on parent computer, much the same as for homework assignments.

In one embodiment, the assignments and other tasks are displayed ordered by their completion times. Color can be used to indicate when it is important that an assignment or task be started immediately or soon, so that it can be completed on time.

In an extended embodiment, the student can arrange the tasks in the order he or she currently contemplates performing them. This display can be further enhanced by superimposing it on a display of scheduled activities, such as school time, so that the student can plan when he or she may work on a particular task. The time management device will use the estimated time to complete the task as provided by the teacher, or can use an estimate provided by the student.

Much the same as the student is rewarded for entering assignments, the student can be rewarded for organizing the tasks and making estimates of their duration. The student could also be awarded bankable points for completing tasks in less time then the teacher had specified or for an accurate estimate by the student of the time required. Of course, receiving these points would require a high grade for the assignment, so that the student does not simply rush through the assignment doing a poor job in order to receive points.

For younger students, the scheduling of when to perform a task or do an assignment could even be in the form of a game, where an avatar representing the student can "walk" through the tasks to be performed and the scheduled activities, collecting rewards as things are completed. The student might plan a walk by arranging and connecting icons representing assignments, tasks, and activities on a map to form the currently-planned "path" through them.

Returning to FIG. 1, in Step 104 the user is able to use the points banked on time management device 201 for some socially desirable reward, such as being able to make or receive telephone calls if the time management device is a cell phone, playing music or watching a video if the time management device has a media player function, or playing a game if the time management device acts as a game console.

In the presently-preferred embodiment, after school hours the time management device can be used as a phone, gaming device, or video or music player, depending on its capabilities. The amount of time that the student is able to access these features will be directly impacted by the banked points previously awarded for validated entry or completion of assignments, as previously discussed.

For instance, if the student has earned 20 points, that might translate into 20 minutes of talking to friends using the time management device as a phone or 40 text messages or 20 minutes of playing games or an hour of listening to music. If no points were currently banked on the time management device, it would not permit any use except for time management, unless special access was allowed by the parent/guardian.

Thus, the immediate rewards at the "point of performance" (visual and numerical cues) would become socially desirable rewards (time using the device) at an after school time.

In an extended embodiment illustrated in FIG. 3, time management device 201 acts as an activation server for other entertainment devices 309, such as game consoles or even television sets with the appropriate access controls installed, communicating over link 310. As with allowing the student to use accumulated points to play games or listen to music on the time management device, points could also be converted to usage time on other devices.

A number of different protocols could be used over communications link 310, all within the spirit of this invention. For example, the student could ask the time management device for an access code number that would permit a specified amount of time on a specified device. That access code could be entered manually into the specified device or transferred to it by using a wired or wireless connection. The appropriate number of points would be taken from the student's accumulated balance, and a log record made that could be reviewed by a parent/guardian.

If the student's time management device has GPS capability, as is common now for devices that include a wireless telephone function, the device could also be programmed to deduct points for various activities based on their location. For example, "hanging out" at the mall or playing with a friend at his or her house could result in points being used based on a formula supplied by the parent/guardian.

By rewarding the desirable behavior of accurately recording assignments and turning them in on time with points, and then translating those points to time doing entertaining activities that the student likes, this invention helps students associate current behaviors with desirable future outcomes.

Research indicates that ADHD youth tend to spend more time playing video games than normed peer groups and that these youth can and do pay attention to situations and circumstances they find interesting or stimulating.

In addition smart phones, pocket PCs, media players, gaming devices, and other high tech gadgets are seen as status symbols and are highly desirable socially for young people. The use of these devices for an intervention would not be perceived as odd, unusual, or stigmatizing. This factor could contribute to student keeping track of the time scheduling device.

In the presently-preferred embodiment, time management device 201 can be a cell phone, portable media player, game player, or a similar device desirable to a young student. All these devices contain a digital computer system that is capable of supporting its user in performing the method of the present invention.

Other digital computer system configurations can also be employed to perform the method of this invention, and to the extent that a particular system configuration is capable of supporting the user in performing the method of this invention, it is equivalent to the digital computer system contained in the time management device described herein, and within the scope and spirit of this invention.

Once they are programmed to perform particular functions pursuant to instructions from program software that implements the method of this invention, such digital computer systems in effect become special-purpose computers particular to the method of this invention. The techniques necessary for this are well-known to those skilled in the art of computer systems.

Computer programs for creating the special-purpose computer supporting the method of this invention will commonly be distributed to users on a distribution medium such as floppy disk or CD-ROM. From there, they will often be copied to a hard disk, flash memory, or a similar intermediate storage medium. When the programs are to be run, they will be loaded either from their distribution medium or their intermediate storage medium into the execution memory of the computer, configuring the computer to support the method of this invention. All these operations are well-known to those skilled in the art of computer systems.

The term "computer-readable medium" encompasses distribution media, intermediate storage media, execution memory of a computer, and any other medium or device capable of storing for later reading by a computer a computer program implementing the method of this invention.

It is to be understood that the above described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of our invention.

We claim:

1. A method for using a multimedia device for supporting time management skills of a student having an executive function disorder, comprising:
    receiving scheduling information about a school assignment from the student, the scheduling information including a description of the school assignment and a time by which the school assignment should be completed;
    displaying an immediate visual reward on the multimedia device in response to receiving the scheduling information from the student;
    transmitting the scheduling information to a teacher for validation to determine the accuracy of the scheduling information entered by the student, the validation completed independently from the completion of the school assignment by the student;
    storing banked points in the multimedia device as determined as a result of the accuracy of the entered scheduling information;
    transmitting the scheduling information to a web-based tracking system accessible to a parent or guardian of the student;
    and
    providing access to a reward for an amount of time based on the number of banked points, wherein the reward is selected from one or more of:
        playing a game on the multimedia device, making or receiving phone calls using the multimedia device, playing music on the multimedia device, watching a video on the multimedia device, or activating an external device for use by the student.

2. The method of claim 1, where the school assignment is a school homework assignment.

3. The method of claim 1, further comprising:
    storing additional banked points in the multimedia device as a result of the school assignment being successfully completed.

4. The method of claim 3, further comprising randomly awarding a jackpot award to the student in response to receiving a grade on the assignment higher than a threshold grade.

5. The method of claim 3, wherein the number of additional banked points stored in the multimedia device is based on a score received on the school assignment.

6. The method of claim 1, wherein the visual reward comprises a animation.

7. The method of claim 1, wherein the visual reward comprises a cartoon.

8. The method of claim 1, wherein the visual reward comprises a numerical indication of points immediately awarded in response to entering the scheduling information.

9. The method of claim 1, further comprising prompting the student to enter school assignment information in response to detecting that no school assignment information has been entered for a class.

10. The method of claim 1, further comprising prompting the student, prior to the student leaving school for the day, to bring home materials needed to complete the assignment.

11. The method of claim 1, further comprising prompting the student to hand in a completed assignment.

12. The method of claim 1, further comprising reducing the number of banked points stored to the multimedia device in response to the teacher adjusting the scheduling information during the validation.

13. The method of claim 1, wherein transmitting the scheduling information to a teacher comprises transmitting the scheduling information to a teacher's grade-recording system.

14. A multimedia device for supporting time management skills of a student having an executive function disorder, the multimedia device having a processor that executes a program contained in a memory, the program implementing a method, the method comprising:
   receiving scheduling information about a school assignment from the student, the scheduling information including a description of the school assignment and a time by which the school assignment should be completed;
   displaying an immediate visual reward on the multimedia device in response to receiving the scheduling information from the student;
   transmitting the scheduling information to a teacher for validation to determine the accuracy of the scheduling information entered by the student, the validation completed independently from the completion of the school assignment by the student;
   storing banked points in the multimedia device as determined as a result of the accuracy of the entered scheduling information;
   transmitting the scheduling information to a web-based tracking system accessible to a parent or guardian of the student;
   and
   providing access to a reward for an amount of time based on the number of banked points, wherein the reward is selected from one or more of:
      playing a game on the multimedia device, making or receiving phone calls using the multimedia device, playing music on the multimedia device, watching a video on the multimedia device, or activating an external device for use by the student.

15. The multimedia device of claim 14, where the school assignment is a school homework assignment.

16. The multimedia device of claim 14, wherein the method further comprises:
   storing additional banked points in the multimedia device as a result of the school assignment being successfully completed.

17. A non-transitory computer-readable medium storing a computer program implementing a method, the method comprising:
   receiving, at a multimedia device, scheduling information about a school assignment from a student, the scheduling information including a description of the school assignment and a time by which the school assignment should be completed;
   displaying an immediate visual reward on a display of the multimedia device in response to receiving the scheduling information from the student;
   transmitting the scheduling information to a teacher for validation to determine the accuracy of the scheduling information entered by the student, the validation completed independently from the completion of the school assignment by the student;
   storing banked points in the multimedia device as determined as a result of the accuracy of the entered scheduling information;
   transmitting the scheduling information to a web-based tracking system accessible to a parent or guardian of the student;
   and
   providing access to a reward for an amount of time based on the number of banked points, wherein the reward is selected from one or more of:
      playing a game on the multimedia device, making or receiving phone calls using the multimedia device, playing music on the multimedia device, watching a video on the multimedia device, or activating an external device for use by the student.

18. The medium of claim 17, where the school assignment is a school homework assignment.

19. The medium of claim 17, the method further comprising:
   storing additional banked points in the multimedia device as a result of the school assignment being successfully completed.

* * * * *